(12) United States Patent
Wiencke et al.

(10) Patent No.: US 11,861,367 B2
(45) Date of Patent: *Jan. 2, 2024

(54) PROCESSOR WITH VARIABLE PRE-FETCH THRESHOLD

(71) Applicant: TEXAS INSTRUMENTS INCORPORATED, Dallas, TX (US)

(72) Inventors: Christian Wiencke, Garching (DE); Johann Zipperer, Unterschleissheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/550,572

(22) Filed: Dec. 14, 2021

(65) Prior Publication Data

US 2022/0100522 A1 Mar. 31, 2022

Related U.S. Application Data

(63) Continuation of application No. 16/843,998, filed on Apr. 9, 2020, now Pat. No. 11,231,933, which is a continuation of application No. 14/255,077, filed on Apr. 17, 2014, now Pat. No. 10,628,163.

(51) Int. Cl.
*G06F 9/38* (2018.01)
*G06F 9/30* (2018.01)

(52) U.S. Cl.
CPC ........ *G06F 9/3814* (2013.01); *G06F 9/30047* (2013.01); *G06F 9/3804* (2013.01)

(58) Field of Classification Search
CPC .................................................... G06F 9/3814
See application file for complete search history.

(56) References Cited

U.S. PATENT DOCUMENTS

| 4,714,994 | A | 12/1987 | Oklobdzija et al. |
| 5,006,471 | A | 3/1991 | Gibson |
| 5,634,136 | A | 5/1997 | Ohshima et al. |
| 5,734,881 | A | 3/1998 | White et al. |
| 6,178,495 | B1 | 1/2001 | Siegel et al. |

(Continued)

*Primary Examiner* — Michael J Metzger
(74) *Attorney, Agent, or Firm* — Brian D. Graham; Frank D. Cimino

(57) ABSTRACT

A method and apparatus for controlling pre-fetching in a processor. A processor includes an execution pipeline and an instruction pre-fetch unit. The execution pipeline is configured to execute instructions. The instruction pre-fetch unit is coupled to the execution pipeline. The instruction pre-fetch unit includes instruction storage to store pre-fetched instructions, and pre-fetch control logic. The pre-fetch control logic is configured to fetch instructions from memory and store the fetched instructions in the instruction storage. The pre-fetch control logic is also configured to provide instructions stored in the instruction storage to the execution pipeline for execution. The pre-fetch control logic is further configured set a maximum number of instruction words to be pre-fetched for execution subsequent to execution of an instruction currently being executed in the execution pipeline. The maximum number is based on a value contained in a pre-fetch threshold field of an instruction executed in the execution pipeline.

20 Claims, 4 Drawing Sheets

(56) References Cited

U.S. PATENT DOCUMENTS

| | | | |
|---|---|---|---|
| 6,275,918 B1 * | 8/2001 | Burky | G06F 9/3455 |
| | | | 712/225 |
| 6,782,461 B2 | 8/2004 | Lam | |
| 6,782,470 B1 | 8/2004 | Berg et al. | |
| 7,103,757 B1 | 9/2006 | Kashyap | |
| 7,359,890 B1 | 4/2008 | Ku et al. | |
| 8,266,344 B1 | 9/2012 | Lampert | |
| 8,291,396 B1 | 10/2012 | Lau et al. | |
| 2006/0174228 A1 | 8/2006 | Radhakrishnan et al. | |
| 2006/0212680 A1 | 9/2006 | Yasue et al. | |
| 2007/0226462 A1 | 9/2007 | Scott et al. | |
| 2007/0234020 A1 | 10/2007 | Jensen | |
| 2008/0010635 A1 | 1/2008 | O'Brien et al. | |
| 2009/0063819 A1 | 3/2009 | Doing et al. | |
| 2009/0138661 A1 | 5/2009 | Lauterbach | |
| 2010/0153934 A1 | 6/2010 | Lachner | |
| 2011/0029758 A1 | 2/2011 | Bartik et al. | |
| 2012/0124336 A1 | 5/2012 | Robertson et al. | |
| 2012/0185651 A1 | 7/2012 | Kimori | |
| 2012/0324142 A1 | 12/2012 | Boyle et al. | |
| 2013/0179663 A1 | 7/2013 | Heisch | |
| 2014/0173254 A1 | 6/2014 | Ruehle | |

* cited by examiner

PROCESSOR WITH VARIABLE PRE-FETCH THRESHOLD

CROSS-REFERENCE TO RELATED APPLICATIONS

This application is a continuation of U.S. patent application Ser. No. 16/843,998, filed Apr. 9, 2020, which is a continuation of U.S. patent application Ser. No. 14/255,077, filed Apr. 17, 2014, now U.S. Pat. No. 10,628,163, each of which is incorporated by reference herein in its entirety.

BACKGROUND

Conditional constructs, such "if-then" and "if-then-else" are commonly used in programming to control the sequence of instruction execution. Such constructs are typically implemented using conditional jump or branch instructions. In pipelined processors jump and branch instructions can cause control hazards. That is, immediately after the jump or branch instruction enters the execution pipeline, subsequent instructions are not executed. Instead, a condition specified by the jump or branch instruction is evaluated (to determine whether to redirect program flow) and if the condition is satisfied, then the instruction at a destination address specified by the jump or branch instruction is fetched. Depending on the system architecture (pipeline depth, instruction bus/memory latency) the number of cycles the pipeline is stalled to resolve the hazard can vary. Stalling reduced processor performance.

Because many if-then and if-then-else instruction sequences include only a few instructions per branch, a pre-fetch buffer that contains instructions fetched in advance serves as a way to reduce the stall cycles caused by conditional constructs. If the target instruction of a branch or jump has been pre-fetched, the target instruction can be read from the pre-fetch buffer instead of fetching the instruction from memory Thus, pre-fetching can reduce the number of stall cycles associated with conditional execution and increase overall processor performance.

SUMMARY

A method and apparatus for controlling pre-fetching in a processor are disclosed herein. In one embodiment, a processor includes an execution pipeline and an instruction pre-fetch unit. The execution pipeline is configured to execute instructions. The instruction pre-fetch unit is coupled to the execution pipeline. The instruction pre-fetch unit includes instruction storage to store pre-fetched instructions, and pre-fetch control logic. The pre-fetch control logic is configured to fetch instructions from memory and store the fetched instructions in the instruction storage. The pre-fetch control logic is also configured to provide instructions stored in the instruction storage to the execution pipeline for execution. The pre-fetch control logic is further configured selectably set a maximum number of instruction words to be pre-fetched for execution subsequent to execution of an instruction currently being executed in the instruction pipeline. The maximum number is based on a value contained in a pre-fetch threshold field of an instruction executed in the execution pipeline.

In another embodiment, a method includes pre-fetching, by a processor, instructions from an instruction memory; storing, by the processor, the pre-fetched instructions in a pre-fetch buffer; reading, by the processor, the pre-fetched instructions from the pre-fetch buffer; and providing, by the processor, the read instructions to an execution pipeline for execution. The method also includes varying, by the processor, a number of instruction words to be pre-fetched for execution subsequent to execution of an instruction currently being executed in the instruction pipeline. The varying is based on a value contained in a pre-fetch threshold field of an instruction executed in the execution pipeline.

In further embodiment, an instruction pre-fetch unit includes instruction storage for storing pre-fetched instructions, and pre-fetch control logic. The pre-fetch control logic is configured to fetch instructions from memory and store the fetched instructions in the instruction storage. The pre-fetch control logic is also configured to provide instructions stored in the instruction storage to an execution pipeline for execution. The pre-fetch control logic is further configured to selectably set a maximum number of instruction words to be pre-fetched for execution subsequent to execution of an instruction currently being executed in the instruction pipeline. The maximum number is based on a value contained in a pre-fetch threshold field of an instruction executed in the execution pipeline.

In a yet further embodiment, a non-transitory computer-readable medium encoded with instructions that when executed cause a computer to identify a jump instruction in a set of instructions. A destination instruction in the set of instructions corresponding to the jump instruction is identified. A distance between the jump instruction and the destination instruction is computed. Based on the distance, an instruction that sets a maximum number of instruction words to be pre-fetched as the jump instruction is executed by a target processor that executes the set of instructions is inserted into the set of instructions.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
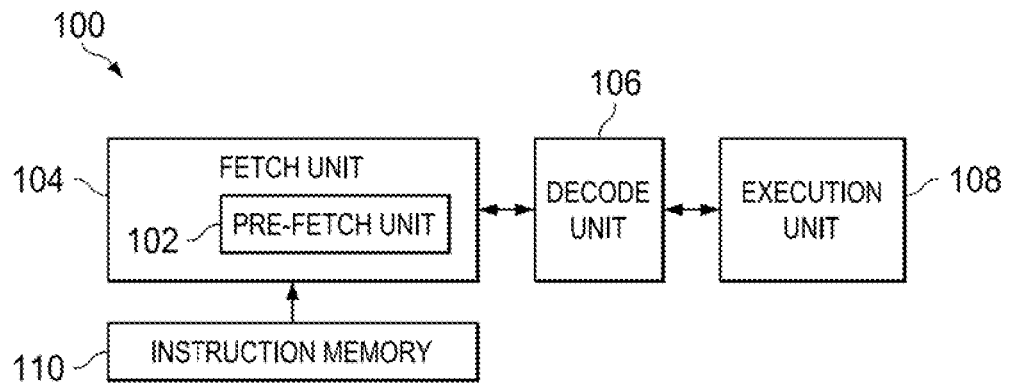
FIG. 1 shows a block diagram of a processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

The terms "branch" and "jump" are used herein as equivalents to refer to a discontinuity in instruction retrieval and execution. Accordingly, the terms "jump instruction" and "branch instruction" are used interchangeably.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

While pre-fetching can increase processor performance by reducing pipeline stalls associated with conditional constructs or instruction memory latency in linear code, pre-fetching is not without its issues. The higher the number of instructions pre-fetched, the higher the likelihood that the pre-fetch buffer contains the target instruction of an executed jump or branch. Accordingly, some conventional processors pre-fetch as many instructions as possible. Unfortunately, if the destination instruction referenced by a jump or branch is too distant from the jump or branch instruction, the destination instruction will not be stored in the pre-fetch buffer, and because memory accesses are typically energy intensive, the pre-fetching will have wasted substantial energy retrieving instructions from memory that will not be executed. Energy consumption may be reduced by pre-fetching fewer instructions. In conventional processors, pre-fetch buffer size is determined as a compromise between performance and energy optimization.

Embodiments of the present disclosure include a dynamically variable pre-fetch threshold. The pre-fetch threshold determines the number of instructions pre-fetched and stored in the pre-fetch buffer, and varying the pre-fetch threshold allows the number of instructions pre-fetched and stored in the pre-fetch buffer to vary under instruction control. When a portion of the instruction stream including conditional constructs for which the destination instruction of a jump or branch is likely to reside in the pre-fetch buffer is to be executed, the pre-fetch threshold may be increased to improve execution performance. In contrast, when a portion of the instruction stream including discontinuities like sub routine calls, unconditional branches, or conditional constructs for which the destination instruction of the discontinuity is not likely to reside in the pre-fetch buffer (e.g., the pre-fetch buffer is too small to contain the jump and its destination) is to be executed, the pre-fetch threshold may be decreased to reduce energy consumption. Embodiments disclosed herein include instructions that allow the pre-fetch threshold to be programmatically adjusted.

FIG. 1 shows a block diagram of a processor 100 in accordance with various embodiments. The processor 100 may be a general purpose microprocessor, a digital signal processor, a microcontroller, or other computing device that executes instructions retrieved from a memory device. The processor 100 includes a fetch unit 104, a decode unit 106, and an execution unit 108. The fetch unit 104 retrieves instructions from instruction memory 110, for execution by the processor 100. The fetch unit 104 provides the retrieved instructions to the decode unit 106. The instruction memory 110 may be included in the processor 100, or external to the processor 100.

The decode unit 106 examines the instructions received from the fetch unit 104, and translates each instruction into controls suitable for operating the execution unit 108, processor registers, and other components of the processor 100 to perform operations that effectuate the instructions. In some embodiments of the processor 100, various operations associated with instruction decoding may be performed in the fetch unit 104 or another operational unit of the processor 100. The decode unit 106 provides control signals to the execution unit 108, and other units of the processor 100, that cause the processor 100 to carry out the operations needed to execute each instruction.

The execution unit 108 includes arithmetic circuitry, shifters, multipliers, registers, logical operation circuitry, etc. that are arranged to manipulate data values as specified by the control signals generated by the decode unit 106. Some embodiments of the processor 100 may include multiple execution units that include the same or different data manipulation capabilities.

The processor 100 may include various other components that have been omitted from FIG. 1 as a matter of clarity. For example, embodiments of the processor 100 may include instruction and/or data caches, memory, communication devices, interrupt controllers, timers, clock circuitry, direct memory access controllers, and various other components and peripherals.

The fetch unit 104 includes a pre-fetch unit 102. The pre-fetch unit 102 pre-fetches instructions from instruction memory 110 prior to when the instructions are to be decoded, and stores the instructions until the instructions are needed for decoding and execution. By pre-fetching instructions, the processor 100 can provide stored instructions for execution without the delays often associated with fetching instructions from a memory device that may be unable to provide instructions at as high a rate as the processor 100 is able to execute the instructions. The pre-fetch unit 102 allows the number of instructions pre-fetched and stored for later execution to vary based on pre-fetch threshold information provided via instructions executed by the processor 100.

A software development system that constructs programs for execution by the processor 100 analyzes jump and branch constructs during program development, and determines whether and/or how much pre-fetching will benefit the execution of the program. If pre-fetching will reduce pipeline stalls caused by the jump or branch instructions, then the software development system will insert in the instruction set (i.e., the program) to be executed by the processor 100, instructions that set the pre-fetch threshold to allow pre-fetching of the jump destination instruction. If pre-fetching will not reduce pipeline stalls caused by particular jump or branch instructions, then the software development system will insert in the instruction set to be executed by the processor 100, instructions that reduce the pre-fetch threshold to reduce energy consumed by pre-fetching instructions that will not be executed.

Figure 2:
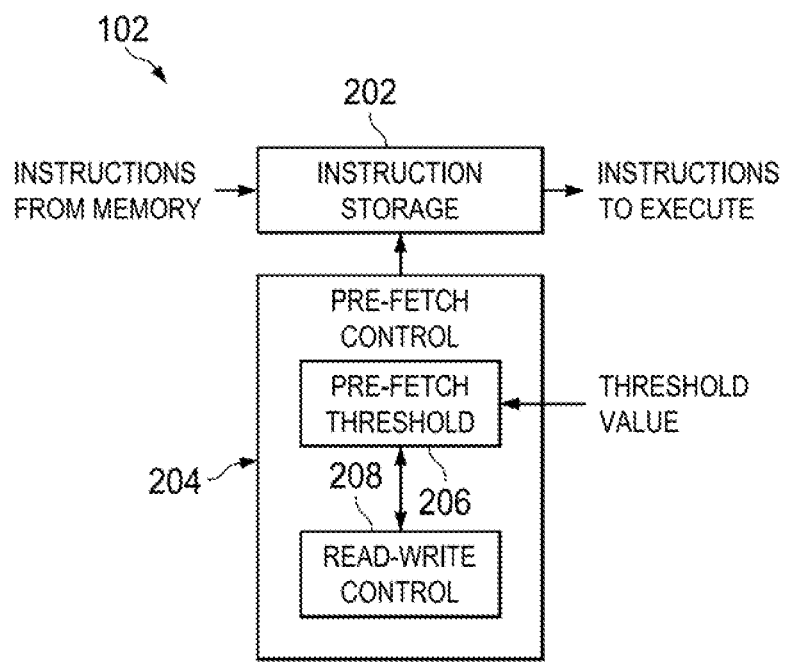
FIG. 2 shows a block diagram of a pre-fetch unit in accordance with various embodiments.

FIG. 2 shows a block diagram of the pre-fetch unit 102 in accordance with various embodiments. The pre-fetch unit 102 includes instruction storage 202 and pre-fetch control logic 204. The instruction storage 202 includes an array of storage cells, such as registers and/or memory devices that store instructions retrieved from the instruction memory 110. Instructions stored in the instruction storage 202 are provided to the decoder 106 for execution by the execution unit 108. The instruction storage 202 may include storage for any number of instructions. For example, embodiments of the instruction storage 202 may store 16, 32, 64, 128, or another number of instruction words. Similarly, the storage cells of the instruction storage 202 may be of any width needed to store instructions executed by the processor 100. For example, the storage cells may be 16 bits in width if the processor 100 executes instructions that are 16-bits (or a multiple of 16-bits) in width. Similarly, the storage cells may be 32 bits in width if the processor 100 executes instructions that are 32-bits (or a multiple of 32 bits) in width, etc. As instructions are pre-fetched, the pre-fetched instructions may be sequentially stored in the instruction storage 202.

The pre-fetch control logic 204 is coupled to the instruction storage 202, and controls pre-fetching of instructions from instruction memory 110, storing of pre-fetched instructions in the instruction storage 202, and reading of instructions from the instruction storage 202 for execution. The pre-fetch control logic 204 includes read-write control logic 208 and a pre-fetch threshold register 206 coupled to the read-write control logic 208. The read-write control logic 208 may including address and access control logic for reading and writing to the instruction storage 202. For example, the read-write control logic 208 may include logic to implement reading and writing of a circular buffer in the instruction storage 202. Storage cells of the circular buffer may be written/over-written when the contents of the storage cells is provided to the decode unit 106, when the circular buffer is flushed due to a flow direction requiring instructions not already in the buffer, etc.

The read-write control logic 208 may also include pre-fetch address and control logic for triggering fetch operations by the fetch unit 104 for fetching of instructions that are to be stored in the instruction storage 202 (i.e., pre-fetching instructions). For example, when storage cells of a circular buffer formed in the instruction storage 202 are available to be written/over-written, the read-write control logic 208 may trigger the fetch unit 104 to fetch instructions to be written to the buffer.

The pre-fetch threshold register 206 limits the number of instructions pre-fetched and stored in the instruction storage 202 in accordance with a pre-fetch threshold value stored in the pre-fetch threshold register 206. For example, a pre-fetch threshold value stored in the pre-fetch threshold register 206 may control the number of instruction words that can be pre-fetched and stored in the instruction storage 202 in advance of execution. If the pre-fetch threshold value specifies that only a few instruction words ahead of an instruction currently being executed may be pre-fetched and stored in the instruction storage, the number of pre-fetch cycles wasted when a program discontinuity causes the buffer to be flushed is reduced. If the pre-fetch threshold value specifies pre-fetching of a greater number of instruction words, then stall cycles will be reduced if the instruction storage contains the pre-fetched destination instruction associated with an executed jump or branch instruction. Similarly, specifying pre-fetching of a greater number of instruction words can reduce stall cycles for linear code fetched from a slow instruction memory, which adds bus stall cycles at high clock frequencies.

In some embodiments of the pre-fetch control logic 204, the pre-fetch threshold value stored in the pre-fetch threshold register 206 controls the number of instruction words pre-fetched by setting a maximum offset between a read pointer that controls instructions read from the instruction storage 202 and a write pointer that controls instructions written to the instruction storage 202. In other embodiments of the pre-fetch control logic 204, the pre-fetch threshold value controls the number of instruction words pre-fetched by setting the number of storage cells of the instruction storage 202 included in a circular buffer that stores pre-fetched instruction words.

The pre-fetch threshold value stored in the pre-fetch threshold register 206 is provided via an instruction executed by the processor 100. A pipeline element (e.g., the decode unit 106 or execution unit 108) identifies an instruction passing through the pipeline that sets the pre-fetch threshold value, extracts the pre-fetch threshold value from the instruction, and provides the pre-fetch threshold value to the pre-fetch unit for storage in the pre-fetch threshold register 206. When the pre-fetch threshold value stored in the pre-fetch threshold register 206 changes, the number of instructions, sequentially following a currently executing instruction, that are pre-fetched changes.

Some embodiments of the processor 100 can decode and execute instructions of various lengths. For example, the decode unit 106 may decode instructions that are 16 bits in length and instructions that are 32 bit in length. To reduce overhead associated with execution of instructions that set a pre-fetch threshold, the decode unit 106 may simultaneously process a pre-fetch threshold instruction and another instruction. For example, a 16 bit pre-fetch threshold instruction may be simultaneously decoded with another 16 bit instruction if the decode unit 106 can receive and decode 32 bit instructions. The decode unit 106 may provide the pre-fetch threshold value to the pre-fetch unit 102. Thus, the processor 100 may provide instruction based pre-fetch threshold adjustment with little or no additional execution cycle overhead.

Figure 3:
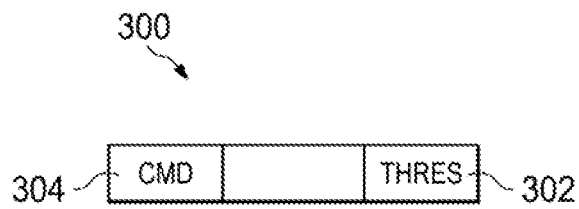
FIG. 3 shows an exemplary instruction for controlling pre-fetch threshold in accordance with various embodiments.

FIG. 3 shows an exemplary instruction 300 for controlling pre-fetch threshold in accordance with various embodiments. In some embodiments, the instruction 300 may be dedicated to setting the pre-fetch threshold (i.e., a command code dedicated to setting pre-fetch threshold). In other embodiments, the instruction 300 may be a general-purpose instruction, such as a load or store instruction, that loads a value into a register (e.g., the pre-fetch threshold register), where the pre-fetch threshold register is, for example, memory mapped. In other embodiments, the instruction 300 may be any instruction executable by the processor 100 that includes a field that is used to transfer pre-fetch threshold information.

The instruction 300 includes a THRES field 302 that specifies the pre-fetch threshold value to be applied in the pre-fetch unit 102. The THRES field 302 may contain a coded value that indicates a maximum number of instruction words to be pre-fetched. For example, a single bit THRES field 302 may be used, where a "1" indicates that the maximum number of instruction words to be pre-fetched corresponds to the maximum number of instruction words storable in the instruction storage 202 (or any predetermined number of instruction words), and a "0" indicates that no (or any predetermined number of) instruction words are to be pre-fetched. In some embodiments, the THRES field 302 may contain a value that specifies a number of instruction words to be pre-fetched. In other embodiments, the pre-fetch threshold value may be encoded in the command code 304 of the instruction 300 or in another field of the instruction 300. In some embodiments of the processor 100, the execution unit 108 or other pipeline element may extract the value from the THRES field 302 and apply further processing to the value prior to providing the value to the pre-fetch unit 102. For example, decoding may be applied to the value provided in the THRES field 302, and the decoded value provided to the pre-fetch unit 102.

Figure 4:
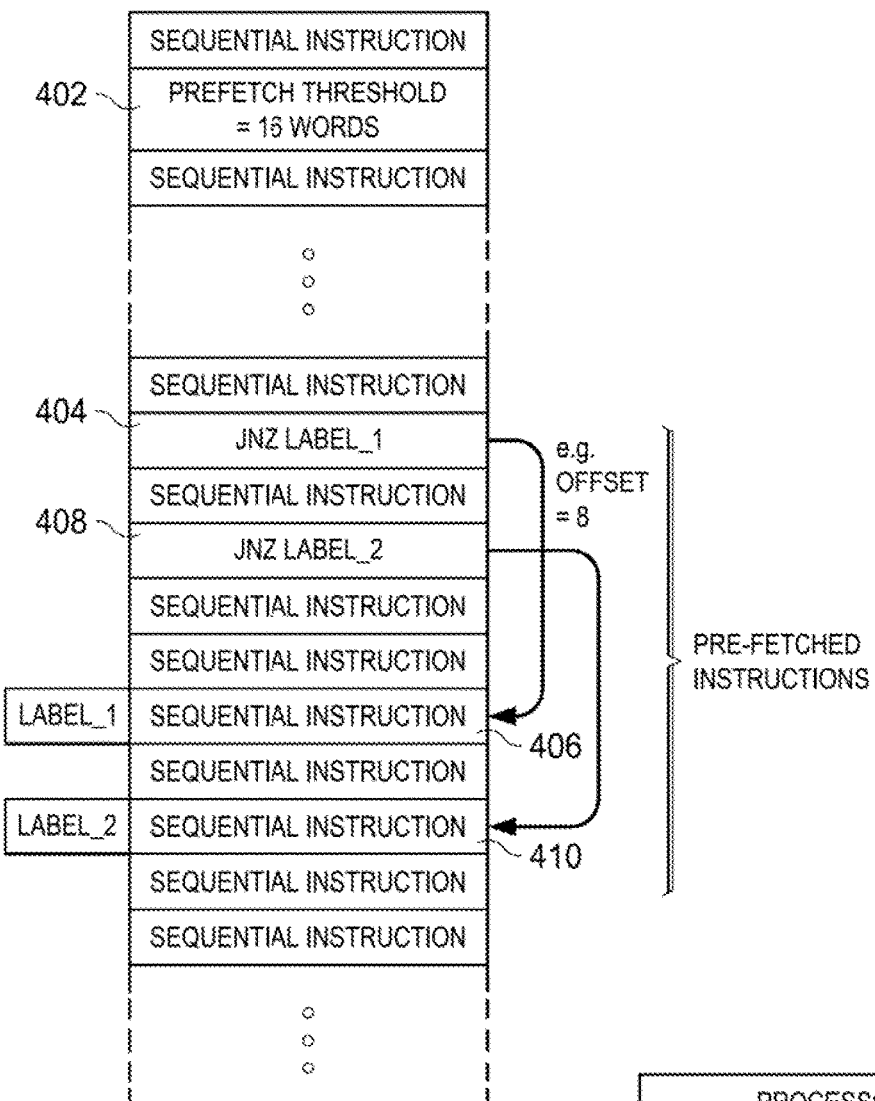
FIG. 4 shows an instruction sequence that includes a pre-fetch threshold set to optimize performance in accordance with various embodiments.

FIG. 4 shows an instruction sequence 400 that includes a pre-fetch threshold set to optimize performance in accordance with various embodiments. The instruction stream 400 includes a pre-fetch threshold instruction 402, jump instructions 404 and 408, and jump destination instructions 406 and 410. Instruction 406 is the destination of jump instruction 404, and instruction 410 is the destination of jump 408. While the instruction sequence 400 is under development, the software development system analyzes the sequence and identifies instructions 404, 406, 408, and 410. The software development system computes the distances between the various jump and destination instructions, and determines whether the instruction storage 202 is large enough to store pre-fetched instructions encompassing jump instructions 404, 408 and jump destination instructions 406, 410. If the instruction storage 202 is large enough to store, for example, 16 instruction words, and the jump instruction 404 through the destination instruction 410 includes 8 instruction words, then software development system may determine that the sequence from jump instruction 404 to destination instruction 410 can be pre-fetched to improve execution efficiency. Accordingly, the software development system can insert pre-fetch threshold instruction 402 in the instruction sequence ahead of the jump instruction 404, where the pre-fetch threshold instruction 402 specifies a pre-fetch threshold value large enough to allow the sequence from the jump instruction 404 through the destination instruction 410 to be pre-fetched and stored in the instruction storage 202. The pre-fetch threshold instruction 402 sets a pre-fetch threshold of 16 instruction words (e.g., the entire instruction storage 202). In other embodiments, the pre-fetch threshold instruction 402 may set the pre-fetch threshold to a different value (e.g., 8, 12, etc.).

Figure 5:
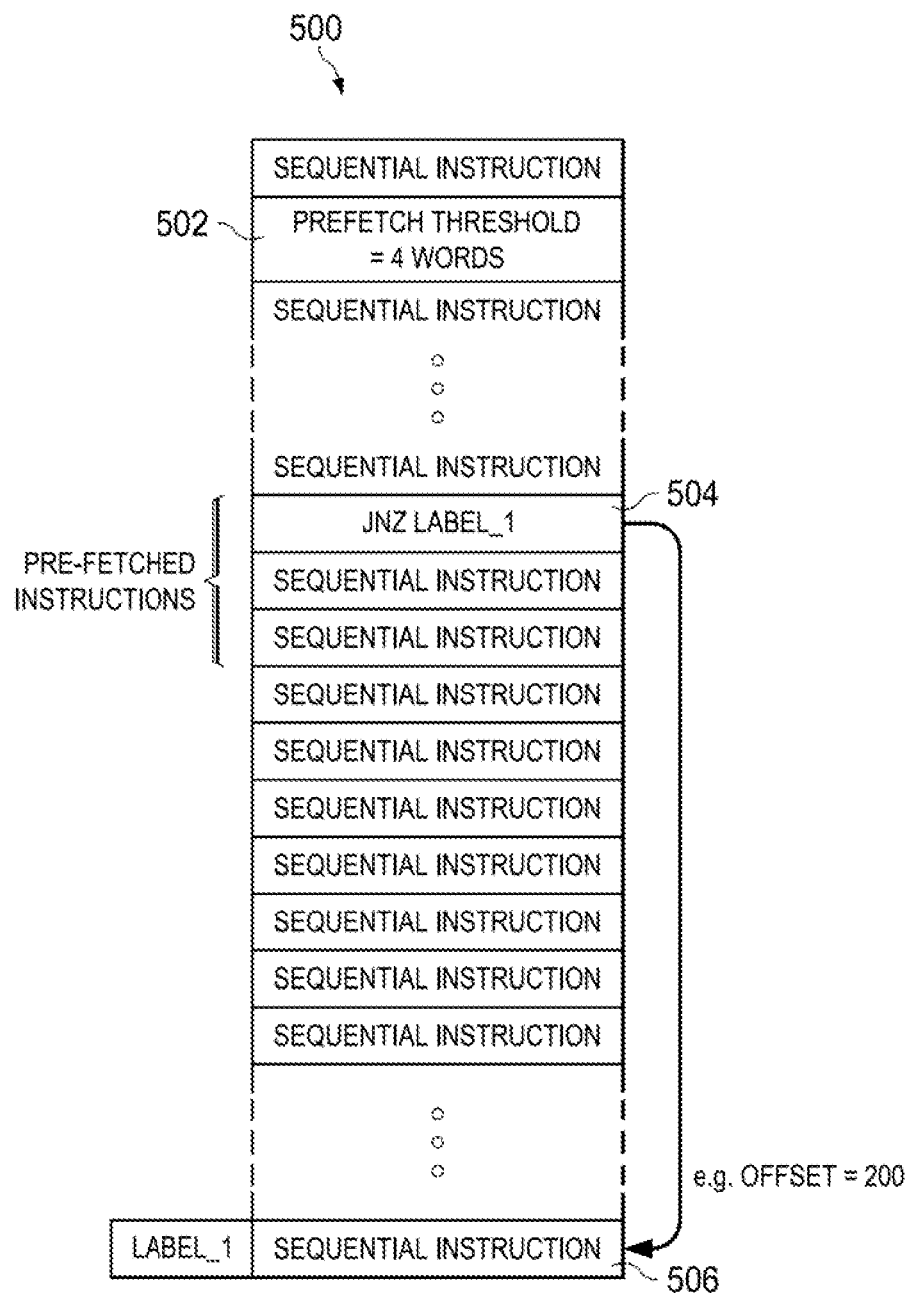
FIG. 5 shows an instruction sequence that includes a pre-fetch threshold set to reduce pre-fetch energy use in accordance with various embodiments.

FIG. 5 shows an instruction sequence 500 that includes a pre-fetch threshold set to reduce pre-fetch energy use in accordance with various embodiments. The instruction stream 500 includes a pre-fetch threshold instruction 502, jump instruction 504, and jump destination instruction 506. While the instruction sequence 500 is under development, the software development system analyzes the sequence and identifies instructions 504 and 506. The software development system computes the distance between instructions 504 and 506, and determines whether the instruction storage 202 is large enough to store pre-fetched instructions encompassing instructions 504 and 506. If the instruction storage 202 is large enough to store, for example, 16 instruction words, and the jump instruction 504 through the destination instruction 506 includes 200 instruction words, then the software development system may determine that the sequence from jump instruction 504 to destination instruction 506 cannot be pre-fetched to improve execution efficiency. Accordingly, the software development system can insert pre-fetch threshold instruction 502 in the instruction sequence ahead of the jump instruction 504, where the pre-fetch threshold instruction 502 specifies a pre-fetch threshold value small enough to reduce extraneous pre-fetching of instructions between instruction 504 and instruction 506 that may not be executed. Thus, the relatively small pre-fetch threshold specified by instruction 502 may save the energy associated with pre-fetching instructions that are not executed. The pre-fetch threshold instruction 502 sets a pre-fetch threshold of 4 instruction words. In other embodiments, the pre-fetch threshold instruction 402 may set the pre-fetch threshold to a different value (e.g., 2, 0, half the instruction storage, etc.).

Figure 6:
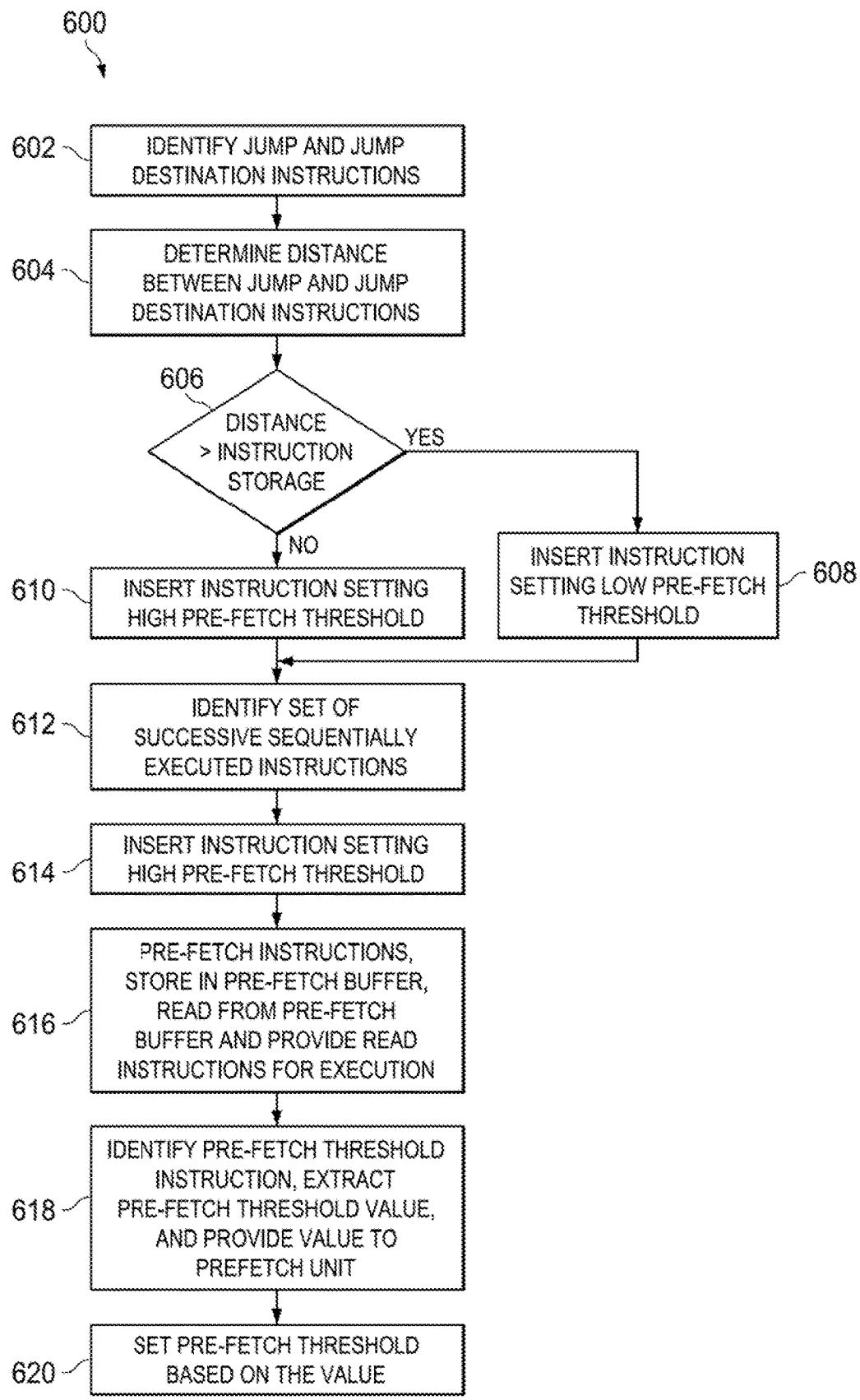
FIG. 6 shows a flow diagram for a method for controlling pre-fetch threshold in accordance with various embodiments.

FIG. 6 shows a flow diagram for a method 600 for setting pre-fetch thresholds in accordance with various embodiments. Though depicted sequentially as a matter of convenience, at least some of the actions shown can be performed in a different order and/or performed in parallel. Additionally, some embodiments may perform only some of the actions shown. At least some of the operations of the method 600 may be performed by a processor executing instructions retrieved from a non-transitory computer readable storage medium.

In block 602, a software program executable by the processor 100 is under development. A tool of a software development system, e.g., a compiler, assembler, or other tool, analyzes instructions of the program and identifies jump or branch instructions and the destination instructions associated with a break in program flow caused by execution of the jump or branch instructions.

In block 604, the tool determines the distance (offset or number of instruction words) between the identified jump or branch instructions and the associated destination instructions. In some embodiments, where jump instructions are in close proximity, the tool may determine the distance between a jump instruction and a destination instruction of a subsequent jump instruction.

In block 606, the tool determines whether the distance is greater than the number of instructions/instruction words that can be stored in the instruction storage 202 of the pre-fetch unit 102.

If the distance exceeds the capacity of the instruction storage 202, then, in block 608, the tool inserts into the instruction sequence a pre-fetch threshold instruction that sets the pre-fetch threshold of the pre-fetch unit 102 to a relatively low value (e.g., 0, 2, 4, etc.).

If the distance does not exceed the capacity of the instruction storage 202, then, in block 610, the tool inserts into the instruction sequence a pre-fetch threshold instruction that sets the pre-fetch threshold of the pre-fetch unit 102 to a relatively high value (e.g., a value large enough to allow storage of the instructions from the jump through the jump destination).

In block 612, the tool identifies a set of successive (i.e., adjacent) instructions in the instruction stream generated by the tool. The set of successive instructions lack flow redirection instructions (jump, call, etc.) and therefore will be sequentially executed by the processor 100. If the number of successive sequentially executed instructions is greater than a predetermined value, then, in block 614, the tool inserts into the instruction sequence a pre-fetch threshold instruction that sets the pre-fetch threshold of the pre-fetch unit 102 to a relatively high value (maximum pre-fetch). Setting the pre-fetch threshold to a high value may accelerate execution of the set of successive instructions by reducing pipeline stalls associated with retrieving the instructions from memory.

The tool may analyze the entirety of the software program under development in accordance with the operations of blocks 602 to 614. For example, each program discontinuity (jump, call, etc.) in the software program may be processed in accordance with blocks 602-610 and each set of successive sequentially executed instructions of the software program may be processed in accordance with blocks 612-614.

Because the analysis and control of the pre-fetch threshold is performed at program build time rather than program run time, the processor 100 need not include logic for determining whether the pre-fetch threshold should be increased or decreased to best accommodate conditional constructs. Accordingly, embodiments of the processor 100 may be less costly and more power efficient than processors that analyze instructions for setting the pre-fetch threshold at run time.

In block 616, the processor 100 is executing the program. The processor 100 is pre-fetching instructions from the instruction memory 100, storing instructions in the instruction storage 202, reading instructions from the instruction storage 202, and providing the pre-fetched instructions read from the instruction storage 202 for execution.

In block 618, a pipeline element (e.g., decode unit 106 or execution unit 108) of the processor 100 identifies a pre-fetch threshold instruction that is being executed. For example, the command code of the instruction is identified. The pipeline element extracts a pre-fetch threshold value from the identified instruction, and provides the pre-fetch threshold value to the pre-fetch unit 102.

In block 620, the pre-fetch unit sets the pre-fetch threshold based on the pre-fetch threshold value. That is, the pre-fetch unit 102 sets the number of instruction words that can be pre-fetched from instruction memory 110 and stored in the instruction storage in accordance with the pre-fetch threshold value.

Figure 7:
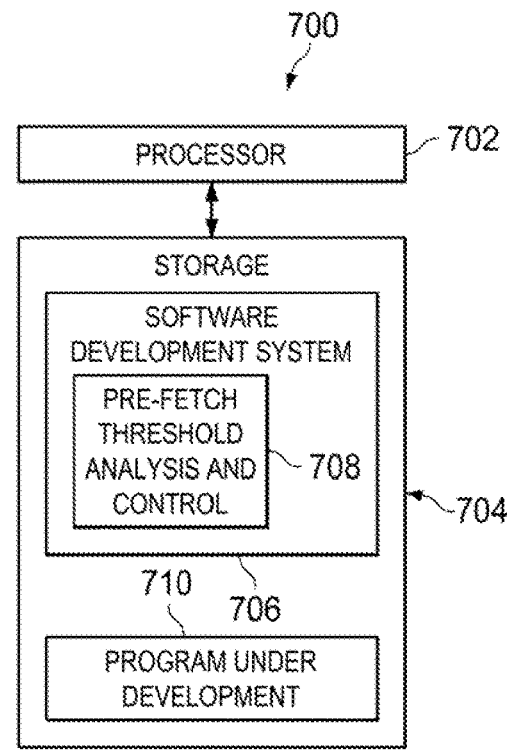
FIG. 7 shows a block diagram of a system for setting pre-fetch thresholds in a set of instructions under development in accordance with various embodiments.

FIG. 7 shows a block diagram of a system 700 for setting pre-fetch thresholds in a set of instructions under development in accordance with various embodiments. The system 700 includes a processor 702 and storage 704. The processor 702 is communicatively coupled to the storage 704. The processor 702 may be a general-purpose microprocessor, a digital signal processor, a microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 704 is a non-transitory computer-readable storage medium suitable for storing instructions that are retrieved and executed by the processor 702 to perform the functions disclosed herein. The storage 704 may include volatile storage such as random access memory, non-volatile storage (e.g., a hard drive, an optical storage device (e.g., CD or DVD), FLASH storage, read-only-memory), or combinations thereof.

The system 700 may include other components and subsystems (not shown) such as a display device, input devices, and various interfaces. The display device may produce images rendered by the processor 702 for viewing by a user of the system 700. The display device may be liquid crystal display (LCD), an organic light emitting diode (OLED) display, a plasma display, or any other type of display device suitable for producing images rendered by the processor 702.

An input device is an instrument that can be manipulated by a user to control the system 700. The input device may be a keyboard, a touch panel integrated with the display device, a pointing device such as a mouse, a trackball, a touch pad, a camera-based input device, or any other instrument suitable for manipulation by a user to operate the system 700.

Interfaces suitable for use in the system 700 may include a network adapter that allows the system 700 to communicate with other devices via wired or wireless networking, multi-media interfaces such as sound generation systems, sound capture systems, video capture systems, etc.

In some implementations, the system 700 may be embodied in a computer, such as a desktop computer, a workstation computer, rack mount computer, a notebook computer, or other form of computer known in the art.

The storage 706 includes software development system 706 and software program under development 710. The program under development 710 is a sequence of instructions executable by the processor 100.

The software development system 706 includes tools for generating the program under development 710, such as a compiler, an assembler, a linker, etc. The software development system 706 also includes a pre-fetch threshold analysis and control tool 708 that analyzes the instructions of the program under development 710, identifies conditional constructs including jump and branch instructions and the destinations of the jump and branch instructions, determines whether the pre-fetch unit 102 can be applied to accelerate execution of the conditional constructs, and inserts pre-fetch threshold instructions in the program under development 710 to set the pre-fetch threshold applied by the pre-fetch unit 102 as described herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device comprising:
an instruction memory operable to store instructions that includes a first instruction specifying a pre-fetch threshold value;
a fetch unit coupled to the instruction memory operable to receive the instructions, wherein the fetch unit includes storage cells configured as a pre-fetch buffer; and
a set of pipeline stages coupled to the fetch unit, wherein the set of pipeline stages includes a decode unit coupled to an execution unit, and wherein the fetch unit is operable to:
receive the first instruction from the instruction memory;
provide the first instruction to the decode unit;
receive the pre-fetch threshold value from the execution unit;
control a number of the storage cells configured as the pre-fetch buffer based on the pre-fetch threshold value;
prefetch a subset of the instructions from the instruction memory; and
store the subset of the instructions in the pre-fetch buffer.

2. The device of claim 1, wherein the execution unit is configured to:
receive the first instruction from the decode unit;
extract the pre-fetch threshold value from the first instruction; and
provide the pre-fetch threshold value to the fetch unit.

3. The device of claim 2, wherein the execution unit is configured to modify the pre-fetch threshold value prior to providing the pre-fetch threshold value to the fetch unit.

4. The device of claim 1, wherein the pre-fetch buffer is structured as a circular buffer.

5. The device of claim 4, wherein:
the circular buffer includes a read pointer and a write pointer; and
the fetch unit is operable to control the number of the storage cells configured as the pre-fetch buffer by setting an offset limit between the read pointer and the write pointer.

6. The device of claim 1, wherein the decode unit is operable to concurrently decode the first instruction and a second instruction of the instructions.

7. The device of claim 1, wherein the pre-fetch threshold value specifies a percentage of total storage cells of the fetch unit to configure as the pre-fetch buffer.

8. The device of claim 1, wherein the pre-fetch threshold value specifies a number of instructions to prefetch.

9. The device of claim 1, wherein the pre-fetch threshold value specifies whether to prefetch any of the instructions.

10. The device of claim 1, wherein the pre-fetch threshold value specifies whether to configure all of the storage cells as the pre-fetch buffer or none of the storage cells as the pre-fetch buffer.

11. A method comprising:
storing instructions that include a first instruction in an instruction memory, wherein the first instruction specifies a pre-fetch threshold value;
receiving the first instruction from the instruction memory by a fetch unit that includes storage cells that include a subset configured as a pre-fetch buffer;
providing the first instruction to a decode unit of a set of pipeline stages;
receiving the pre-fetch threshold value from an execution unit of the set of pipeline stages;
setting a number of the storage cells in the subset configured as the pre-fetch buffer based on the pre-fetch threshold value;
prefetching a subset of the instructions from the instruction memory;
storing the subset of the instructions in the pre-fetch buffer; and
providing the subset of the instructions from the pre-fetch buffer to the set of pipeline stages.

12. The method of claim 11, wherein the pre-fetch threshold value specifies a percentage of the storage cells to include in the subset configured as the pre-fetch buffer.

13. The method of claim 11, wherein the pre-fetch threshold value specifies a number of instructions to prefetch.

14. The method of claim 11, wherein the pre-fetch threshold value specifies whether to prefetch any of the instructions.

15. The method of claim 11, wherein the pre-fetch threshold value specifies whether to configure all of the storage cells as the pre-fetch buffer or none of the storage cells as the pre-fetch buffer.

16. The method of claim 11, wherein the pre-fetch buffer is structured as a circular buffer.

17. The method of claim 16, wherein circular buffer includes a write pointer and a read pointer and the setting of the number of the storage cells in the subset configured as the pre-fetch buffer includes setting a maximum offset between the write pointer and the read pointer.

18. A system comprising:
means for storing instructions that include a first instruction in an instruction memory, wherein the first instruction specifies a pre-fetch threshold value;
means for providing the first instruction to a decode unit of a set of pipeline stages;
means for receiving the pre-fetch threshold value from an execution unit of the set of pipeline stages;
means for setting a number of storage cells configured as a pre-fetch buffer based on the pre-fetch threshold value;
means for prefetching a subset of the instructions from the instruction memory;
means for storing the subset of the instructions in the pre-fetch buffer; and
means for providing the subset of the instructions from the pre-fetch buffer to the set of pipeline stages.

19. The system of claim 18, wherein the means for setting the number of the storage cells configured as the pre-fetch buffer comprise means for setting an offset limit between a read pointer of the pre-fetch buffer and a write pointer of the pre-fetch buffer.

20. The system of claim 18, further comprising:
means for extracting the pre-fetch threshold value from the first instruction;
means for modifying the pre-fetch threshold value; and
means for storing the modified pre-fetch threshold value in a pre-fetch threshold register.

* * * * *